(12) United States Patent
Huang et al.

(10) Patent No.: US 7,430,654 B2
(45) Date of Patent: Sep. 30, 2008

(54) DYNAMIC INSTRUCTION DEPENDENCY MONITOR AND CONTROL SYSTEM

(75) Inventors: Hsilin Huang, Milpitas, CA (US); Kuoyin Weng, Milpitas, CA (US); Yijung Su, Alviso, CA (US)

(73) Assignee: VIA Technologies, Inc., Hsinchu, Taipei (TW)

( * ) Notice: Subject to any disclaimer, the term of this patent is extended or adjusted under 35 U.S.C. 154(b) by 855 days.

(21) Appl. No.: 10/616,647

(22) Filed: Jul. 9, 2003

(65) Prior Publication Data

US 2005/0021930 A1 Jan. 27, 2005

(51) Int. Cl.
*G06F 9/30* (2006.01)
(52) U.S. Cl. ..................................... 712/217
(58) Field of Classification Search .............. 712/216, 712/217, 218
See application file for complete search history.

(56) References Cited

U.S. PATENT DOCUMENTS

| | | | | |
|---|---|---|---|---|
| 4,807,115 A | * | 2/1989 | Torng | 712/215 |
| 5,430,851 A | * | 7/1995 | Hirata et al. | 712/212 |
| 5,748,934 A |   | 5/1998 | Lesartre et al. | |
| 5,850,533 A | * | 12/1998 | Panwar et al. | 712/216 |
| 5,913,049 A | * | 6/1999 | Shiell et al. | 712/215 |
| 6,438,681 B1 | * | 8/2002 | Arnold et al. | 712/216 |

OTHER PUBLICATIONS

FOLDOC; pipeline definition; 1996.*
Hirata et al.; "An Elementary Processor Architecture with Simultaneous Instruction Issuing from Multiple Threads"; 1992; ACM.*

* cited by examiner

*Primary Examiner*—Tonia L. M. Dollinger
*Assistant Examiner*—Benjamin Geib
(74) *Attorney, Agent, or Firm*—Thomas, Kayden, Horstemeyer & Risley

(57) ABSTRACT

Method and system for controlling the dynamic latency of an arithmetic logic unit (ALU). In one embodiment, the identification of the destination operand of an instruction is stored in a temporary register ID/thread control ID pair pipeline if the destination operand is a temporary register. Furthermore, each source operand of an instruction is checked against the identifications stored in a group of temporary register ID/thread control ID pipelines. If a source operand is matched to an identification stored in the temporary register ID/thread control ID pipelines, the ALU does not execute the instruction until the matched identification is no longer matched in the pipelines.

27 Claims, 3 Drawing Sheets

DYNAMIC INSTRUCTION DEPENDENCY MONITOR AND CONTROL SYSTEM

BACKGROUND OF INVENTION

1. Field of Invention

The present invention relates generally to superscalar microprocessors. More particularly, the present invention relates to a method and system for dynamic dependency monitor and control.

2. Related Art

In order to achieve high performance, multiple instructions may be executed per clock cycle in superscalar microprocessors. Moreover, storage devices such as a register or an array capture their values according to the clock cycle. In an exemplary embodiment, a storage device captures a value on the rising or falling edge of a clock signal that defines the clock cycle, and the storage device then stores the value until the following rising or falling edge of the clock signal.

Although instructions may be processed in any number of stages, instruction processing generally comprises fetching instruction, decoding instruction, executing instruction, and storing the executed results in a destination specified in the instruction. Furthermore, each instruction may be processed in a pipelined fashion in logic circuits herein referred to as "instruction processing pipelines".

A superscalar microprocessor receives instructions in order, and although a compiler may recompile the order of the instructions from a program, the order of instruction dependency still needs to be maintained. However, whereas in-order instruction execution guarantees the integrity of the original program, out of order execution may alter the intended functionality of the original program. For example, a dependency problem may occur if the instructions shown below were executed out of order:

| add | r0, s1, s2 | Instruction 1 |
| mul | O, s3, r0 | Instruction 2 | wherein the first instruction aggregates the values stored in a first source operand s1 and a second source operand s2 and stores the sum in a destination temporary register r0, and the second instruction multiplies the values stored in a third source operand s3 and the temporary register r0 and stores the product in an output register O. As referred to herein, a source operand is a value operated upon by the instruction and a destination operand is the result of the instruction. In the example shown above, the second instruction requires a source operand (r0) whose value is determined in the first instruction, therefore the second instruction is said to have a dependency on the first and cannot be executed until the first instruction is fully executed. In the example above, assuming a pipeline latency of five cycles, the microprocessor cannot begin executing the second instruction until five cycles after the first instruction launched.

One conventional method employed to solve the dependency problem as illustrated above is to execute the instructions with a multi-thread method. In an exemplary embodiment, a number of single instruction multiplex data (SIMD) processors are employed wherein each SIMD processor processes a distinct data stream of the same instruction. An example program shown below is an illustration of an SIMD approach using six threads to process Instruction 1 and Instruction 2 shown above, assuming a five cycle arithmetic logic unit (ALU) latency:

| add | str0.r0, str0.s1, str0.s2 | Data Stream 1 |
| add | str1.r0, str1.s1, str1.s2 | Data Stream 2 |
| add | str2.r0, str2.s1, str2.s2 | Data Stream 3 |
| add | str3.r0, str3.s1, str3.s2 | Data Stream 4 |
| add | str4.r0, str4.s1, str4.s2 | Data Stream 5 |
| add | str5.r0, str5.s1, str5.s2 | Data Stream 6 |
| mul | str0.O, str0.s3, str0.r0 | Data Stream 1 |
| mul | str1.O, str1.s3, str1.r0 | Data Stream 2 |
| mul | str2.O, str2.s3, str2.r0 | Data Stream 3 |
| mul | str3.O, str3.s3, str3.r0 | Data Stream 4 |
| mul | str4.O, str4.s3, str4.r0 | Data Stream 5 |
| mul | str5.O, str5.s3, str5.r0 | Data Stream 6 | in the example shown directly above, six data streams are used to process Instruction 1 and Instruction 2. Moreover, Instruction 2 depends on Instruction 1 due to its use of register r0, and therefore Instruction 2 must wait at least five cycles after Instruction 1 begins before proceeding to execution. As shown in the example above, dependency problems do not arise if the number of threads exceeds the number of latency cycles. However, ALU latency may be significant in various systems, and the increasing number of threads is costly as each thread requires additional hardware to incorporate components such as input buffers and temporary registers.

SUMMARY OF INVENTION

Accordingly, the present invention provides a method and a system for dynamic dependency monitor and control. In one embodiment of the present invention, a number of temporary register ID/thread control ID pipelines are coupled to an arbiter, and the arbiter is in turn coupled to one or more thread control elements on one end and to an ALU on a second end. If the destination operand of an instruction is a temporary register, an identification corresponding to the temporary register is loaded into the temporary register ID/thread control ID pipelines. Moreover, an identification corresponding to each source operand of an instruction is compared to the identifications stored in the temporary register ID/thread control ID pipelines, if a source operand identification matches an identification stored in the temporary register ID/thread control ID pipelines, the ALU does not begin executing the instruction until the identification is no longer stored in the temporary register ID/thread control ID pipelines.

The present invention checks the source operands of each instruction and rearranges the sequence of data being executed in order to resolve dependency problems. The present invention reduces gate count by maintaining dependency control without employing additional threads. Moreover, the dependency control and monitor system of the present invention is dynamic and may scale to accommodate a wide range of ALU latencies.

BRIEF DESCRIPTION OF DRAWINGS

The accompanying drawings that are incorporated in and form a part of this specification illustrate embodiments of the invention and together with the description, serve to explain the principles of the invention.

DETAILED DESCRIPTION OF EXEMPLARY EMBODIMENT (S)

The following description is presented to enable one of ordinary skill in the art to make and use the invention and is provided in the context of a patent application and its requirements. In the following description, specific nomenclature is set forth to provide a thorough understanding of the present invention. It will be apparent to one skilled in the art that the specific details may not be necessary to practice the present invention. Furthermore, various modifications to the embodiments will be readily apparent to those skilled in the art and the generic principles herein may be applied to other embodiments. Thus, the present invention is not intended to be limited to the embodiments shown but is to be accorded the widest scope consistent with the principles and features described herein.

Figure 1:
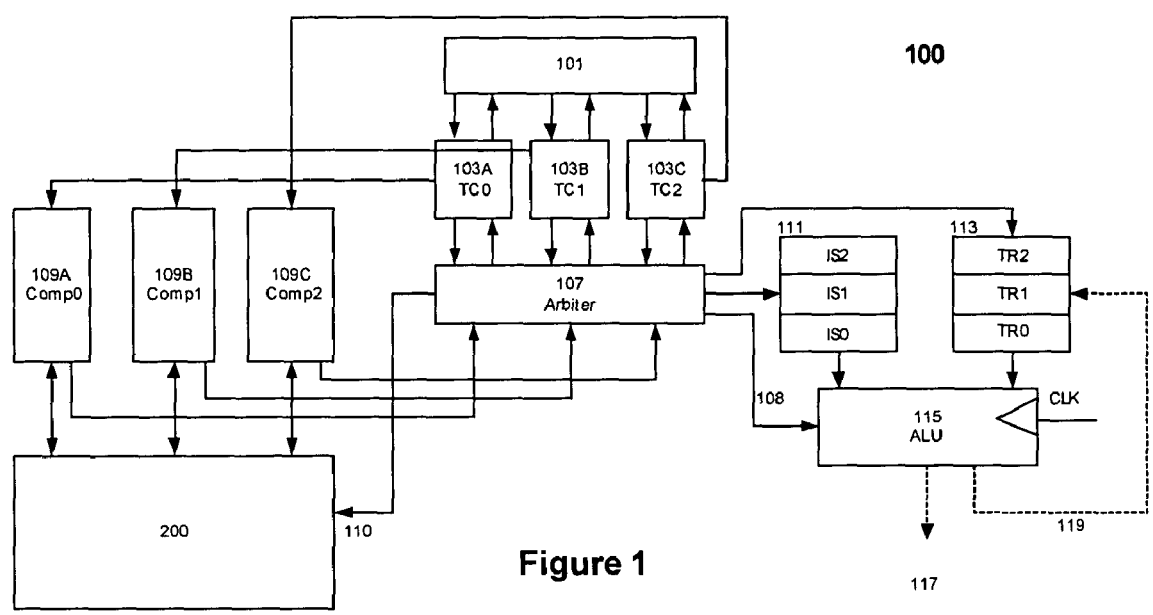
FIG. 1 is a block diagram illustrating an instruction buffer, a group of thread control elements, a group of comparators, a temporary register ID/thread control ID pipeline unit, an arbiter, and an ALU in accordance to one embodiment of the present invention.

FIG. 1 illustrates a system 100 for dependency monitor and control in accordance to one embodiment of the present invention. System 100 comprises: an instruction buffer denoted 101, a group of thread control elements TC0, TC1, and TC2 denoted with numbers 103A, 103B, and 103C respectively, an arbiter denoted 107, a group of comparators Comp0, Comp1, and Comp2 denoted with numbers 109A, 109B, and 109C respectively, a temporary ID/thread control ID pipelines unit denoted 200, a group of three input data stream buffers IS0, IS1, and IS2 denoted aggregately 111, a group of three temporary register buffers TR0, TR1, and TR2 denoted aggregately as 113, and an arithmetic logic unit (ALU) denoted 115.

The system shown in FIG. 1 illustrates a multi-thread processing approach employing three threads, each thread controlled by a thread control element 103A, 103B, and 103C respectively. The three thread elements allows three distinct input data streams to be processed simultaneously, and each thread control element acquires instruction data streams from the instruction buffer 101. Having acquired an instruction data stream from the instruction buffer 101, a thread control element sends the source operand ID's of the acquired instruction data stream along with a thread control ID to a comparator corresponding to the thread control element. For example, having acquired an instruction data stream, TC0 denoted 103A sends one or more ID's of the acquired instruction source operands along with a thread control ID of TC0 to Comp0 denoted 109A. Moreover, each thread control element and comparator forms a bi-directional correspondence.

The thread control element sends an instruction request to the arbiter 107. The temporary register ID/thread control ID pipelines unit 200 comprises a group of pipelines, each pipeline of the group of pipelines may contain a null value or a temporary register ID/thread control ID pair.

Once a comparator receives one or more source operand ID's along with a thread control ID, the comparator compares each source operand ID of the one or more source operand ID's and the thread control ID to each of the temporary register ID/thread control ID pairs contained in the temporary register ID/thread control ID pipelines unit 200.

If a match is found between a received source ID/thread control ID pair and a temporary register ID/thread control ID pair in pipelines unit 200, the pipelines unit 200 alerts the comparator that received the matched source ID/thread control ID pair, and the comparator in turn alerts the arbiter 107 of the match. If the arbiter 107 receives a match alert from a comparator, the arbiter prohibits the instruction held in the corresponding thread control element from executing in that clock cycle. If the arbiter 107 prohibits a thread control element from executing the instruction in a clock cycle due to a match signal from the corresponding comparator, the comparator continuously compares the source ID's and thread control ID to the pipelines unit 200 until no match is found between the source ID's and the content of pipelines unit 200. Once none of the source operand ID's of the instruction held in the thread control element matches the content of pipelines unit 200, the arbiter 107 sends an acknowledgement signal to the thread control element that the instruction execution will proceed.

Simultaneously, while an instruction held in a thread control element is prohibited to execute during a cycle due to one or more source operands matching one or more temporary registers in the temporary register ID/thread control ID pipelines, the arbiter may allow the execution of a second instruction held in a second thread control element to proceed in that cycle provided that none of the source operands of the second instruction matches any of the temporary registers in the temporary register ID/thread control ID pipelines. For example, if at least one of the source operands of the instruction held in TC0 matches at least one of the temporary registers in the temporary register ID/thread control ID pipelines in a cycle, the arbiter may allow an instruction held in TC1 to proceed in that cycle provided that none of the source operands of the instruction held in TC1 matches any of the temporary registers in the temporary register ID/thread control ID pipelines. In a further example, in a cycle, if both instructions held in TC0 and TC1 have at least one source operand each that match one or more temporary registers in the pipelines, the arbiter may then allow a third instruction held in TC2 to proceed in that cycle provided that none of the source operands of the instruction held in TC2 matches any of the temporary registers in the temporary register ID/thread control ID pipelines. If all the instructions held in the thread control elements have at least one source operand matching a temporary register in the pipelines in that cycle, the arbiter does not grant any of the instruction requests in that cycle and will only grant an instruction request when at least one of the thread control elements holds an instruction whose source operands do not match any of the temporary registers in the temporary register ID/thread control ID pipelines.

Once the arbiter 107 grants an instruction request from a thread control unit, the arbiter 107 proceeds to send one or more addresses corresponding to the operands of the instruction to the input data stream buffers 111 and/or to the temporary register buffers 113. Moreover, whether the arbiter 107 sends address signals to the input stream buffers 111, the temporary register buffers 113, or both buffers 111 and 113, depends on whether any of the instruction operand is stored in a temporary register. The input data stream buffers 111 and/or the temporary register buffers 113 locate the data at the addresses received from the arbiter 107 and send the data to ALU 115. The ALU 115 receives operand data of an instruction from the input data stream buffers 111 and/or the temporary register buffers 113 along with an operation mode signal 108 from the arbiter 107 (e.g. add, multiply, etc.) and proceeds to carry out the instruction. Moreover, the ALU 115 produces an output 117 or an output 119. The output may be sent to another block (i.e. output 117) in the system or sent to the temporary register buffers 113 (i.e. output 119) if the destination operand is a temporary register.

Figure 2:
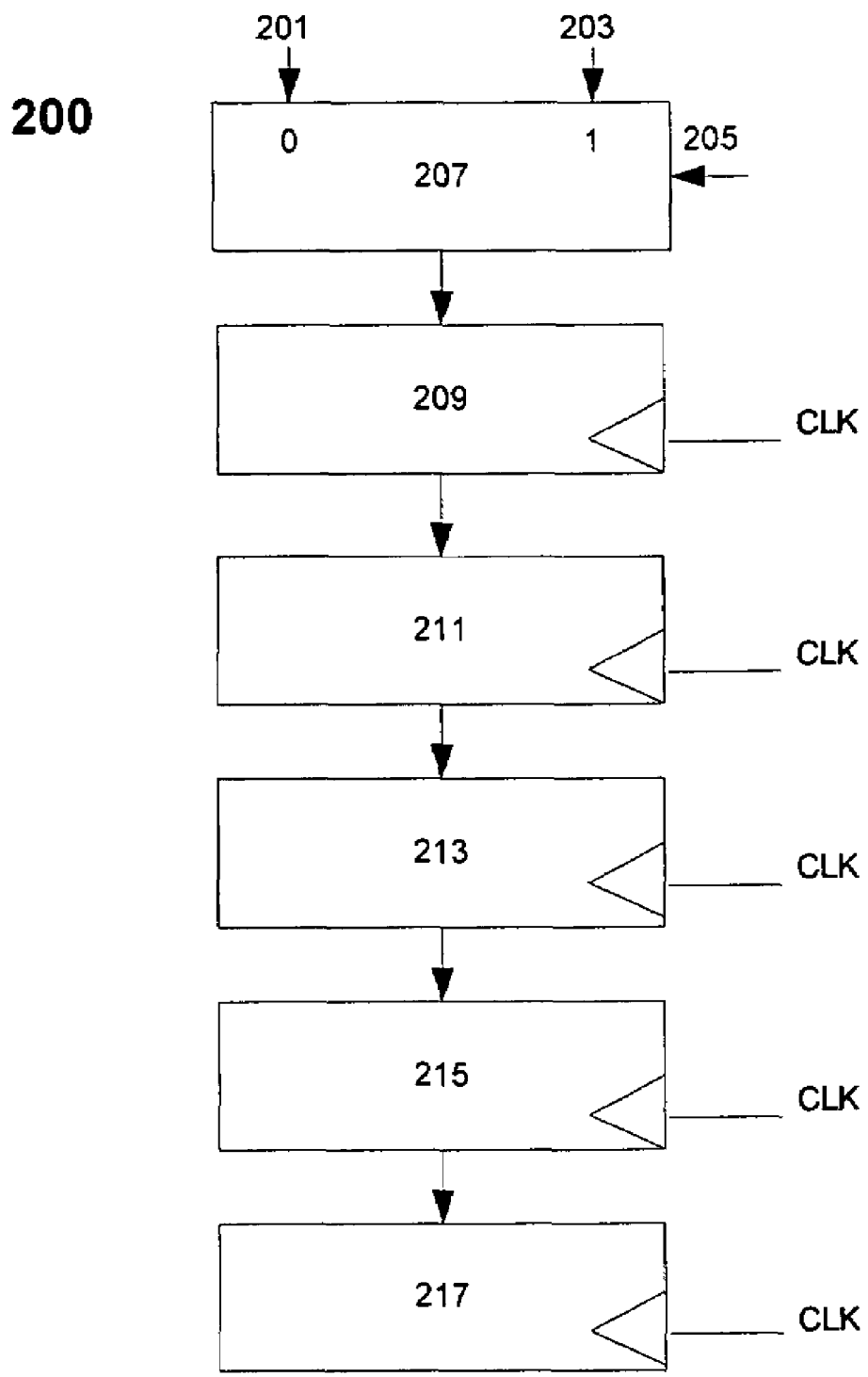
FIG. 2 is a detailed illustration of the temporary register ID/thread control ID pipeline unit shown in FIG. 1.

FIG. 2 is a detailed illustration of temporary register ID/thread control ID pipelines unit 200. Pipelines unit 200 is illustrated assuming a five cycle ALU latency, and comprises: a multiplexer 207, a first pipeline denoted 209, a second pipeline denoted 211, a third pipeline denoted 213, a fourth pipeline denoted 215, and a fifth pipeline denoted 217.

As illustrated in FIG. 2, multiplexer 207 functions as a gateway to the temporary register pipelines 209, 211, 213, 215, and 217; and comprises two selection signals denoted 201 and 203 respectively in addition to a selector denoted 205. Moreover, selector 205 receives a signal 110 (shown in FIG. 1) from the arbiter 107 (shown in FIG. 1) that indicates whether the instruction being carried out by the arbiter 107 comprises a destination operand that is a temporary register. In one exemplary embodiment, if the destination operand of the instruction is a temporary register, the multiplexer 207 selects data stream 203 as the input to pipeline 209, wherein data stream 203 comprises an identification corresponding to the temporary register. Conversely, if the destination operand of the instruction is not a temporary register, the multiplexer 207 selects data stream 201 as the input to pipeline 209, wherein data stream 201 comprises a null value.

Furthermore, the temporary register ID/thread control ID pipelines are coupled in series and the content (e.g. null value or temporary register ID/thread control ID pair) of each pipeline is passed from one to the next at the clock timing of the clock signal CLK. For example, pipeline 209 captures the value of a first temporary register identification on the rising or falling edge of clock signal CLK, pipeline 209 then stores the value of the first temporary register identification until the rising or falling edge of the next clock cycle when the first temporary register identification data is passed onto pipeline 211. Simultaneously, with the exception of pipeline 217, the remaining pipelines each passes its content to the next pipeline (e.g. 211 to 213, 213 to 215, 215 to 217) at the rising or falling edge of clock signal CLK. The content of pipeline 217 is released from the temporary register pipelines at the rising or falling edge of the clock signal CLK.

Figure 3:
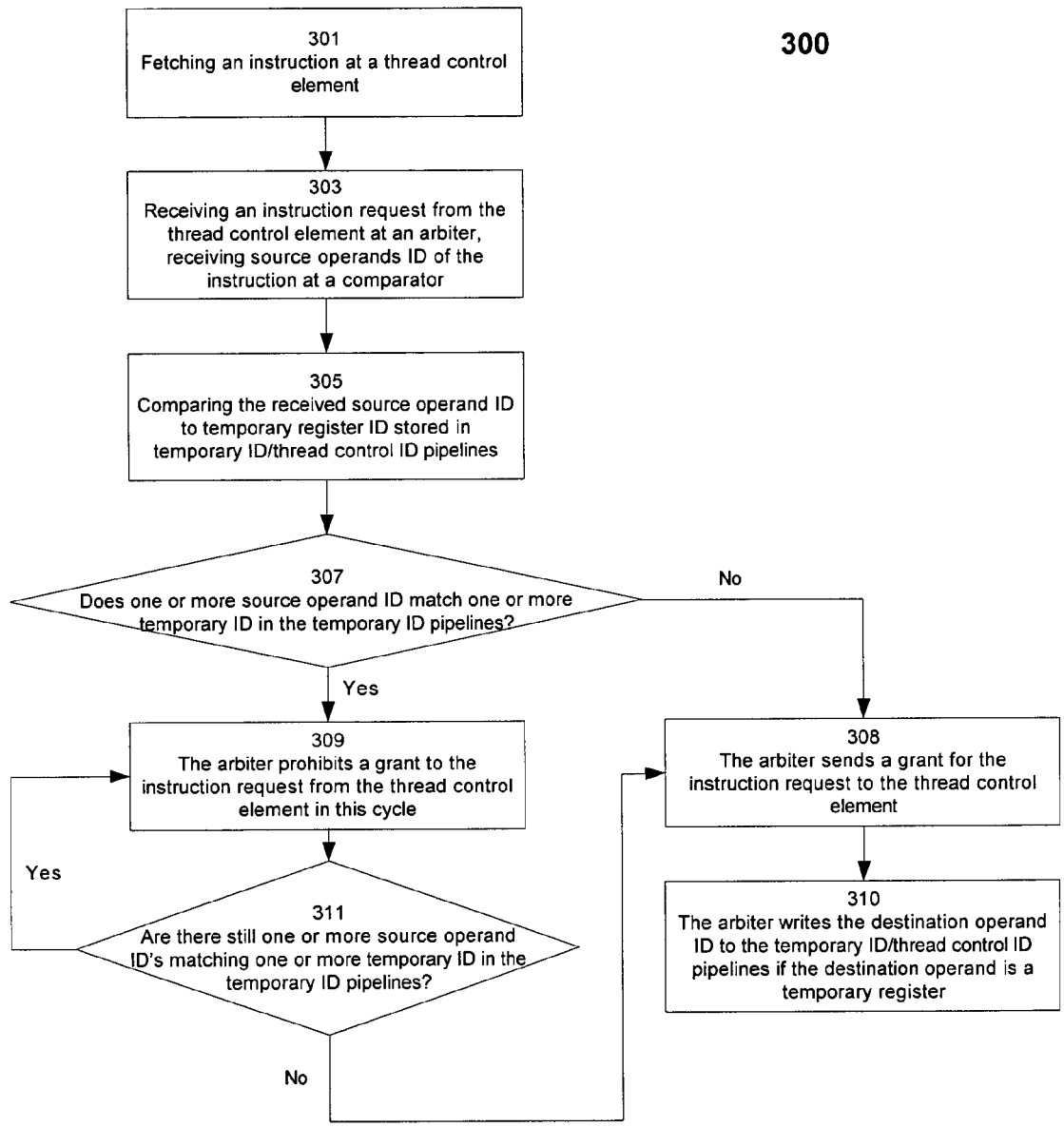
FIG. 3 is a flow diagram illustrating the functional steps of a dependency monitor and control system in accordance to one embodiment of the present invention.

FIG. 3 is a flow diagram illustrating the functional steps of a dependency monitor and control system in accordance to one embodiment of the present invention. In step 301, a thread control element such as TC0 denoted 103A shown in FIG. 1 fetches an instruction from an instruction buffer such as buffer 101 shown in FIG. 1.

In step 303, the thread control element sends an instruction request to an arbiter such as arbiter 107 shown in FIG. 1. Furthermore in step 303, the thread control element sends source operand ID's of the fetched instruction along with a thread control ID of the thread control element to a comparator corresponding to the thread control element. In step 305, the comparator compares each source operand ID and the thread control ID received from the thread control element to the content of a group of cascaded temporary register ID/thread control ID pipelines. If none of the source operand ID's matches the content of the temporary register ID/thread control ID pipelines, the arbiter grants the instruction request and sends an acknowledgment to the thread control element in step 308. In step 310, the arbiter writes the destination operand ID along with the thread control ID of the thread control element to the first pipeline of the cascaded temporary register ID/thread control ID pipelines if the destination operand is a temporary register.

Referring now back to step 307 of FIG. 3, if one or more of the source operand ID/thread control ID pairs match one or more temporary register ID/thread control ID pairs in the temporary register ID/thread control ID pipelines, the arbiter prohibits a grant to the instruction request from the thread control element in step 309. Moreover, in step 311, the comparator compares each source operand ID and the thread control ID to the content of the temporary register ID/thread control ID pipelines again in the next clock cycle. If one or more source operand ID/thread control ID pairs still match one or more temporary register ID/thread control ID pairs in the temporary register ID/thread control ID pipelines, step 311 loops back to step 309. Conversely, if none of the source operand ID's matches the content of the temporary register ID/thread control ID pipelines in the clock cycle, the arbiter grants the instruction request and sends an acknowledgment to the thread control element in step 308. In step 310, the arbiter writes the destination operand ID along with the thread control ID of the thread control element to the first pipeline of the cascaded temporary register ID/thread control ID pipelines if the destination operand is a temporary register.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the arts to best utilize the invention and various embodiments with various modifications as are suited to the particular use contemplated. It is intended that the scope of the invention be defined by the claims appended hereto and their equivalents.

For example, although FIG. 1 illustrates three thread control elements and three comparators, the number of thread control elements varies with the number of threads employed in an multi-thread system and the number of comparators varies directly with the number of thread control elements, wherein each comparator is paired to a thread control element to form a one-to-one relationship. Moreover, FIG. 1 illustrates three input data stream buffers IS0, IS1, and IS2, as well as three temporary register buffers TR0, TR1, and TR2; in alternative embodiments, the number of individual buffers in the group of buffers 111 and the number of individual buffers in the group of buffers 113 vary directly with the number of threads employed in an multi-thread system. For example, incorporating an additional thread in a system would increase buffers 111 and buffers 113 each by an additional input data stream buffer and a temporary register buffer respectively.

Furthermore, FIG. 2 illustrates a temporary register ID/thread control ID pipelines unit 200 having five individual pipelines corresponding to five ALU latency cycles. In alternative embodiments, the number of pipelines in the pipelines unit 200 varies directly with the number of ALU latency cycles. For example, the pipelines unit 200 is scalable such that instruction dependencies for a system having six latency cycles can be monitored and controlled by incorporating an additional pipeline to the pipelines unit 200 illustrated in FIG. 2.

We claim:

1. A method of monitoring and controlling instruction dependency for microprocessors, the method comprising:
   fetching an instruction at thread control element from an instruction buffer;
   comparing, with a comparator, one or more source operand identifications of the instruction to one or more temporary register identifications, comparing, with the comparator, a thread control ID associated with the thread control element with pipeline thread control IDs in a pipeline, wherein each thread control element and comparator forms a bi-directional correspondence, and wherein each of the one or more temporary register identifications is stored in a temporary register identification pipeline storage location of a set of one or more temporary register identification pipeline storage locations;

verifying whether any of the one or more source operand identifications at the thread control element matches any of the one or more temporary register identifications and verifying whether the thread control ID associated with the thread control element matches any pipeline thread control IDs; and in response to a match between the source operand identification and the temporary register identification and a match between the thread control ID associated with the thread control element and a pipeline thread control ID, prohibiting the instruction held in the corresponding thread control element from executing in that clock cycle, wherein the match corresponds to instruction dependency.

2. The method of claim 1, wherein none of the one or more source operand identifications in the thread control element matches any of the one or more temporary register identifications.

3. The method of claim 2, further comprising the step of initiating execution of the instruction.

4. The method of claim 3, further comprising the step of verifying whether a destination operand of the instruction is a temporary register.

5. The method of claim 4, wherein the destination operand is not a temporary register.

6. The method of claim 5, further comprising the step of writing a null value into a first pipeline storage location of the set of one or more temporary register pipeline storage locations.

7. The method of claim 4, wherein the destination operand is a temporary register.

8. The method of claim 7, further comprising the step of writing an identification corresponding to the destination operand into a first pipeline storage location of the set of one or more temporary register pipeline storage locations.

9. The method of claim 1, wherein the content in all except the last of the set of one or more temporary register pipeline storage locations is shifted to the next pipeline storage location at the beginning of each clock cycle.

10. The method of claim 9, wherein the content of the last pipeline storage location of the set of one or more temporary register pipelines storage locations is released at the beginning of each clock cycle.

11. The method of claim 1, wherein at least one of the one or more source operands at the thread control element matches one of the one or more temporary register identifications.

12. The method of claim 11, further comprising the step of prohibiting execution of the instruction.

13. The method of claim 12, further comprising the step of comparing the one or more source operand identifications at the thread control element to the one or more temporary register identifications at the beginning of each clock cycle until none of the one or more source operand identifications matches any of the one or more temporary register identifications.

14. The method of claim 13, further comprising the step of verifying whether a destination operand of the instruction is a temporary register.

15. The method of claim 14, wherein the destination operand is not a temporary register.

16. The method of claim 15, further comprising the step of writing a null value into a first pipeline storage location of the set of one or more temporary register pipeline storage locations.

17. The method of claim 14, wherein the destination operand is a temporary register.

18. The method of claim 17, further comprising the step of writing an identification corresponding to the destination operand into a first pipeline storage location of the set of one or more temporary register pipeline storage locations.

19. A method of monitoring and controlling instruction dependency for microprocessor systems, the method comprising:

a) fetching an instruction at a thread control element;

b) receiving an instruction request at an arbiter, wherein the instruction request is issued from the thread control element;

c) comparing one or more source operand identifications of the instruction at the thread control element to one or more temporary register identifications and comparing a thread control ID associated with the thread control element with pipeline thread control IDs in a pipeline, wherein each of the one or more temporary register identifications is stored in a temporary register identification pipeline storage location of a set of one or more temporary register identification pipeline storage locations, and wherein said one or more source operand instructions at said thread control element is not part of a pipeline or pipelines;

d) verifying whether any of the one or more source operand identifications matches any of the one or more temporary register identifications and verifying whether the thread control ID associated with the thread control element matches a pipeline thread control ID;

e) in response to a match of the source operand identification and the temporary register identification and a match between the thread control ID associated with the thread control element and the pipeline thread control ID, prohibiting the instruction held in the corresponding thread control element from executing in that clock cycle, wherein the match corresponds to instruction dependency;

f) if none of the one or more source operand identifications matches any of the one or more temporary register identifications:

f1) verifying whether a destination operand of the instruction is a temporary register; and f2) performing only one operation selected from the group consisting of the following:

f2a) if the destination operand of the instruction is a temporary register: writing an identification corresponding to the destination operand into a first pipeline storage location of the set of one or more temporary register pipeline storage locations;

f2b) if the destination operand of the instruction is not a temporary register: writing a null value into a first pipeline storage location of the set of one or more temporary register pipeline storage locations.

20. The method of claim 19, further comprising the step of initiating execution of the instruction.

21. The method of claim 19, if at least one of the one or more source operand identifications at the thread control element matches one of the one or more temporary register identifications in step f), further comprising the steps of:

prohibiting the execution of the instruction;

reiterating step d) until none of the one or more source operand identifications matches any of the one or more temporary register identifications; and verifying whether a destination operand of the instruction is a temporary register.

22. The method of claim 21, wherein the destination operand is a temporary register.

23. The method of claim 22, further comprising the step of writing an identification corresponding to the destination operand into a first pipeline storage location of the set of one or more temporary register pipeline storage locations.

24. The method of claim 21, wherein the destination operand is not a temporary register.

25. The method of claim 24, further comprising the step of writing a null value into a first pipeline storage location of the set of one or more temporary register pipeline storage locations.

26. the method of claim 19, wherein the content in all except the last of the set of one or more temporary register pipeline storage locations is shifted to the next pipeline storage location at the beginning of each clock cycle.

27. The method of claim 26, wherein the content of the last pipeline storage location of the set of one or more temporary register pipeline storage locations is released at the beginning of each clock cycle.

* * * * *